United States Patent [19]

Kasselmann et al.

[11] 3,995,911

[45] Dec. 7, 1976

[54] TOW VEHICLE-TRAILER BRAKING SYSTEM

[75] Inventors: John T. Kasselmann; Thomas B. Fenzel, both of South Bend, Ind.

[73] Assignee: The Bendix Corporation, South Bend, Ind.

[22] Filed: Sept. 29, 1975

[21] Appl. No.: 618,295

[52] U.S. Cl. .................................. 303/2; 188/3 R; 303/7; 303/10; 303/13; 303/84 R
[51] Int. Cl.² ......................................... B60T 13/16
[58] Field of Search ................. 303/7, 2, 6 R, 6 A, 303/10, 13, 19, 28, 29, 50, 84, 89, 40, 22; 188/3, 112

[56] References Cited

UNITED STATES PATENTS

| | | | |
|---|---|---|---|
| 2,336,342 | 12/1943 | Brewer, Jr. | 303/7 |
| 3,183,919 | 5/1965 | Herring | 303/28 X |
| 3,323,619 | 6/1967 | Lacy | 188/112 |
| 3,360,303 | 12/1967 | De Castelet | 303/7 |
| 3,415,576 | 12/1968 | Henry-Biaband | 303/40 X |
| 3,702,207 | 11/1972 | Armstrong | 303/22 A |
| 3,771,838 | 11/1973 | Rossigno et al. | 303/7 |
| 3,912,334 | 10/1975 | Schwerin et al. | 188/3 R X |
| 3,915,506 | 10/1975 | Farron et al. | 188/3 R X |

*Primary Examiner*—Trygve M. Blix
*Assistant Examiner*—Douglas C. Butler
*Attorney, Agent, or Firm*—Leo H. McCormick, Jr.; William N. Antonis

[57] ABSTRACT

A control valve for use in a tow vehicle-trailer braking system has a first bore connected to a master cylinder and a second bore with an entrance port connected to a pump in the tow vehicle for receiving a fluid under pressure, an exit port connected to a power steering control operated by the fluid under pressure, and a control port connected to a servomotor in the trailer. A first piston is located in the first bore and a second piston is located in the second bore. A lever which is located on a pivot pin connects the first piston with the second piston. When the operator applies a braking force to operate the master cylinder, the first piston receives a hydraulic force which acts on the lever to move the second piston and direct a portion of the pump fluid under pressure from the exit port to the control port to activate the servomotor brakes in the trailer.

8 Claims, 2 Drawing Figures

TOW-VEHICLE - TRAILER BRAKING SYSTEM

BACKGROUND OF THE INVENTION

In vehicles equipped with power steering gears, hydraulic fluid from a pump continually flows through the steering gears under pressure. In the prior art it is shown how a portion of the hydraulic fluid may be diverted to operate a master cylinder in the tow vehicle. However, because of the cost of the valving required to control the flow of the power steering fluid, the automobile industry has not accepted this type of braking.

The Department of Transportation in recent years has set forth braking standards which have to be met by automobile manufacturers. Most automobiles have modified their braking system to adequately meet these standards. However, when these vehicles are coupled with a recreational trailer it is possible that the combination tow vehicle-trailers will not meet these braking standards.

Most recreational trailers now being produced have electric brakes located thereon. Unfortunately, the braking torque in electric brakes is limited to the size of the magnetic armature in the brake. In order to provide better braking, it has been proposed that hydraulic brakes be installed on the trailer. In one known trailer braking system, a surge actuator is employed and whenever the deceleration rate between the tow vehicle and the trailer reaches a predetermined value, a master cylinder is actuated and brakes the trailer. In another known trailer braking system, a pneumatic signal is communicated from a servomotor in the tow vehicle to operate a similar servomotor in the trailer.

SUMMARY OF THE INVENTION

We have devised a control valve means for operating a trailer braking system in response to an operator input by diverting a portion of the output fluid under pressure away from the power steering gear. The control valve means has a first bore and a second bore. The first bore is connected to the master cylinder in the tow vehicle while the second bore is connected through an entrance port to the power steering pump. An exit port connects the second bore with the power steering gear to provide continuous hydraulic fluid communication to the power steering system. A first piston located in the first bore is responsive to a hydraulic force transmitted from the master cylinder. A second piston located in the second bore prevents the power steering hydraulic fluid from being communicated to a servomotor in the trailer braking system. A lever is pivotally located on the housing to translate movement of the first piston into the second piston. When the second piston moves, a portion of the hydraulic fluid is diverted into the control port for moving a plunger means which operates the servomotor in the trailer in synchronization with the wheel brakes on the tow vehicle.

It is therefore the object of this invention to provide a tow vehicle-trailer braking system with a control valve for diverting a portion of the operational fluid of a power steering gear to a servomotor in a trailer brake system in response to a braking signal originating in the tow vehicle.

It is another object of this invention to provide a control valve with a first piston responsive to a braking signal in a tow vehicle and a second piston moved by a lever means as a function of the movement of the first piston to provide a braking signal for operating a servomotor in a trailer.

It is a still further object of this invention to provide a control valve means with a gain control through which a spool valve is operated to divert a portion of the output of a pump into a brake signal for operating a servomotor in a trailer.

These and other objects will become apparent from reading this specification and viewing the drawings.

DETAILED DESCRIPTION OF THE PREFERRED EMBODIMENT

Figure 1:
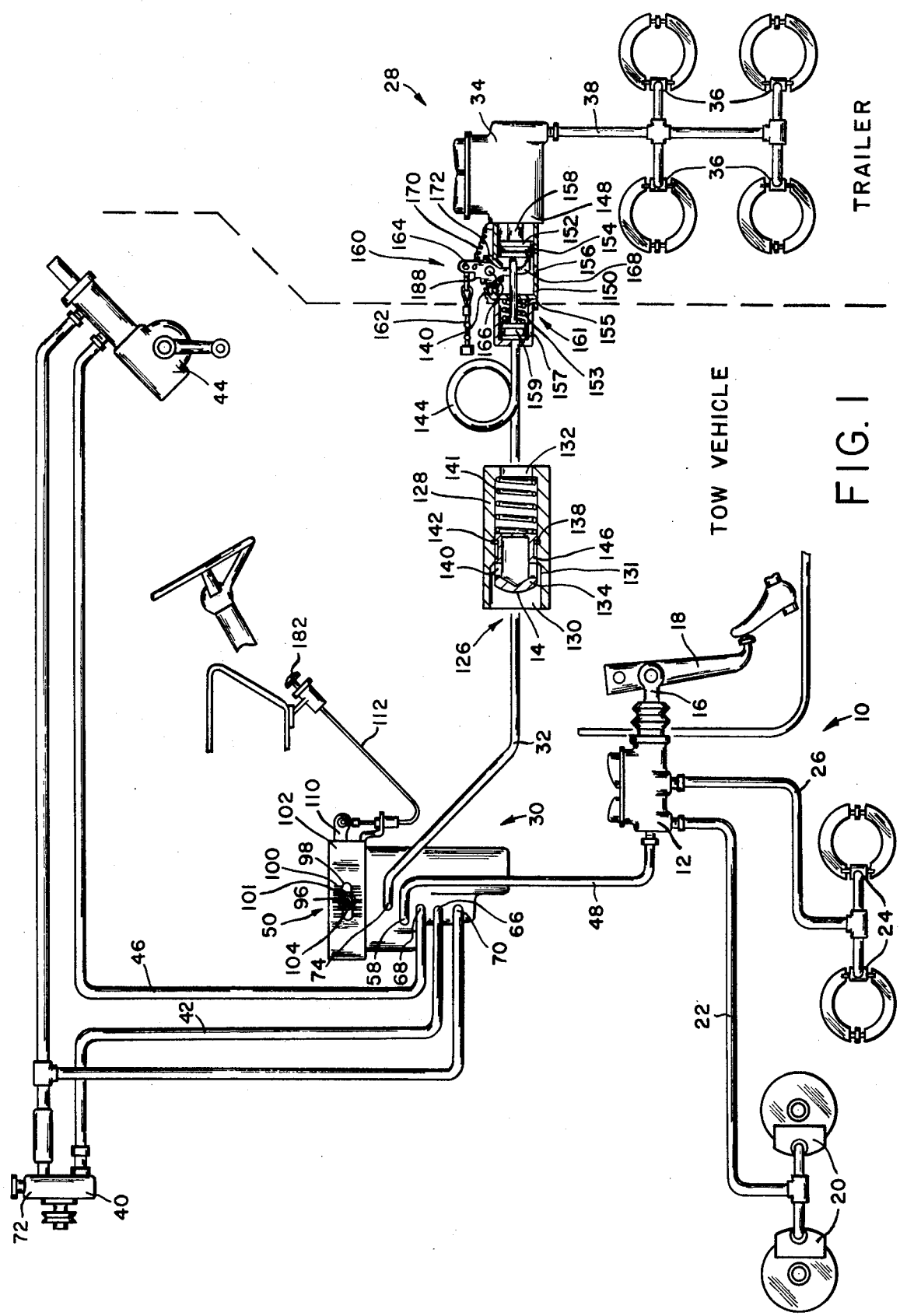
FIG. 1 is a schematic illustration of a tow vehicle-trailer braking system having a control valve responsive to a braking signal in the tow vehicle to divert a portion of the output of a power steering pump to operate a braking system in a trailer.

The tow vehicle braking system 10 in the tow vehicle consists of a master cylinder 12 which is responsive to the input push rod 16 operated by foot pedal 18. The master cylinder 12 is connected to the front wheel brakes 20 through line 22 and to the rear wheel brakes 24 through line 26. The tow vehicle braking system 10 is connected to the trailer braking system 28 through a control valve means 30 located in the control conduit 32.

The trailer braking system 28 has a master cylinder 34 which is connected to the trailer brakes 36 through conduit 38.

The control valve means 30 is connected to the power steering pump 40 through conduit 42 and to the power steering gear 44 through conduit 46.

Whenever the operator applies an input to pedal 18, a tow vehicle braking force develops in master cylinder 12. The tow vehicle braking force is communicated through conduit 48 into the control valve means 30 to divert a portion of the hydraulic fluid from pump 40 into control conduit 32 for operating master cylinder 34.

By adjusting a gain control means 50 in the control valve means 30, it is possible to bring about synchronization between the brakes in the tow vehicle and the trailer.

Figure 2:
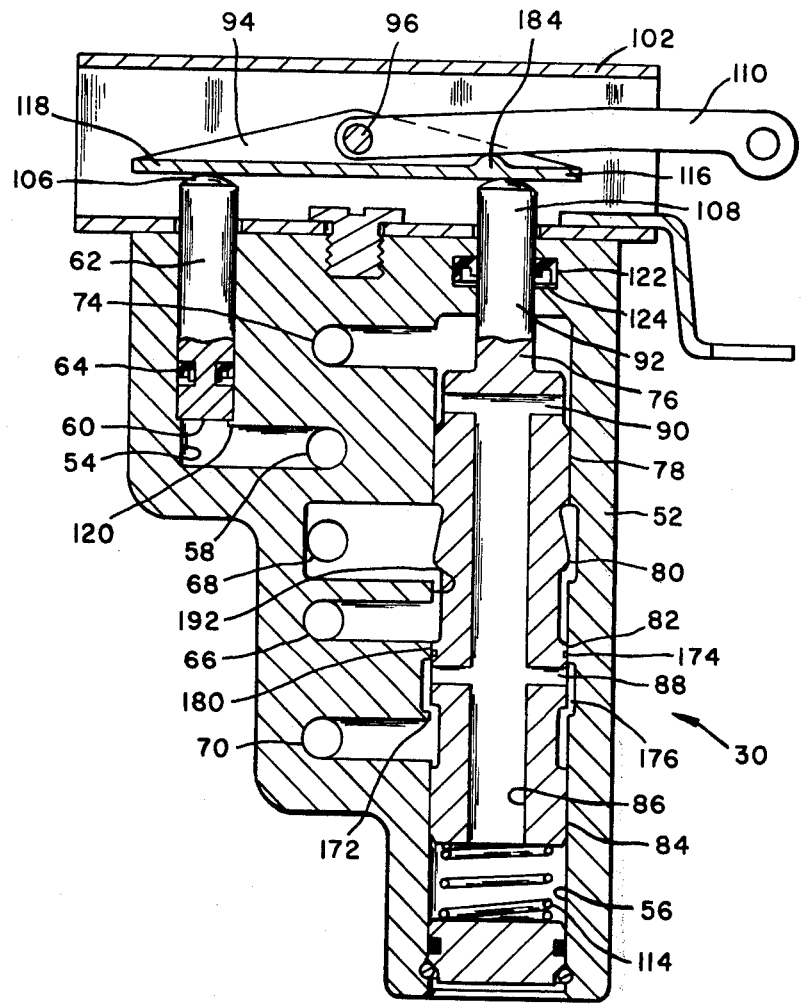
FIG. 2 is a sectional view of the control valve means of FIG. 1.

The control valve means 30 is shown in FIG. 2 in more particular detail as having a housing 52 with a first bore 54 and a second bore 56 located therein.

The first bore 54 has an entrance port 58 connected to conduit 48 for communicating hydraulic fluid from the master cylinder 12 to the face 60 of a first piston 62. A seal 64 carried by the first piston 62 prevents hydraulic brake fluid from escaping from the first bore 54.

The second bore 56 has a second entrance port 66 connected to the pump 40 through conduit 42 and an exit port 68 connected to the power steering gear 44 through conduit 46. A return port 70 connects the second bore 56 with a reservoir 72 in the pump 40 and a control port 74 connects the second bore 56 with the control conduit 32.

A second piston 76 located in the second bore 56 has a first land 78, a second land 80, a third land 82 and a fourth land 84 located thereon to sequentially segregate the entrance port 66 from the return port 70 and the control port 74 to allow the entire output from pump 40 to continually flow to the power steering gear during periods of non-braking. The second piston 76 has an axial bore 86 with a first radial or cross bore 88 located in land 82 and a second radial or cross bore 90 located between the first land 78 and a stem 92. The axial bore 86 permits the control port 74 to be freely communicated with the return port 70 and thereby establish ambient pressure in the control conduit 32.

The first piston 62 is connected to the second piston 76 through the lever 94 of the gain control means 50. The lever 94 is fixed to a pin 96 which is movable in slot 98. A series of ribs 100 extend from the cover housing 102 and are mated with a washer 104 which has vertical ribs thereon. A nut 101 is attached to threads on pin 96 and fixes the location of the pin 96 with respect to the end 106 of the first piston 62 and end 108 of the second piston 76. An actuation lever 110 which is also located on the pin 96 is connected to a hand control cable 112. The hand control cable 112 is mounted in the cab area of the tow vehicle. A spring 114 located in the bottom of the second bore 56 urges the second piston 76 into contact with the end 116 of the lever 94 to cause end 118 to pivot around pin 96 to move the first piston 62 against stop 120.

The housing 52 has a groove 122 located therein into which seal 124 is positioned to engage stem 92 and prevent any of the hydraulic power steering fluid from being communicated out of the second bore.

As a safety feature, a hydraulic fuse or check valve means 126 is located in the control conduit 32 to prevent flow therethrough if a failure should occur in the trailer braking system 28. The hydraulic fuse 126 has a housing 128 with axial bore 131 having an entrance port 130 and an exit port 132. A poppet 134 has a closed end 14 and a cylindrical section 138. A radial bore 140 extends through the cylindrical section 138 to provide a flow path between the entrance port 130 and the exit port 132 through the cylindrical section 138. A spring 141 is located in the axial bore 131 to hold the poppet against a stop 142 to maintain the flow path. If a break should occur in the flexible portion 144 of the supply conduit 32, continuous rapid flow of hydraulic fluid through radial bore 140 creates a pressure drop across closed end 14 of the poppet 134. The pressure drop creates a force which overcomes the spring 141 and moves the radial bore past the lip 146 to interrupt the flow of hydraulic fluid between the entrance port 130 and the exit port 132.

The master cylinder 34 in the trailer braking system 28 has a housing 148 with a cylindrical projection 150 to which the flexible portion 144 of the supply conduit 32 is attached. A piston 152 located in the cylindrical projection has a seal 154 which prevents brake fluid from being transmitted to the hydraulic power steering fluid in the supply conduit 32. A vent hole 156 is located along the bottom of the cylindrical projection 150 to provide an escape to the atmosphere for any brake fluid which may seep past seal 154. The piston 152 has a first push rod 158 attached thereto for operating the power piston (not shown) in the master cylinder 34 and a second push rod for engaging piston 159 in the disconnect means 161. The housing 157 of the disconnect means 161 has a twist lock means 155 for joining the control conduit 32 with the master cylnder 34. A spring 153 holds the piston 159 in the release position.

A lanyard means 160 which is attached to the tow vehicle by chain 162, has an actuation arm 164 connected to the master cylinder 34. The actuation arm 164 is pivotally retained on projection 150 through pin 166. End 168 is located in the cylindrical projection 150 adjacent the piston 152 and acts as a stop for the return spring in the master cylinder 34. A spring 170 holds the actuation arm 164 against a stop 172 to prevent end 168 from following the movement of piston 152 upon movement thereof in response to the hydraulic power steering signal.

MODE OF OPERATION OF THE PREFERRED EMBODIMENT

When the operator in the tow vehicle applies an input force to foot pedal 18, the master cylinder 12 produces a hydraulic operational force for effecting brake actuation of the front wheels 20 and the rear wheels 24 in the tow vehicle braking system 10. This tow vehicle hydraulic operational force is communicated into the first bore 54 of the control means 30 and moves the first piston 62 away from stop 120 in opposition to spring 114. The movement of the first piston through the lever arm 94 is modified by the postion of the pivot pin 96 to correspondingly move the second piston 76 in the following sequence. Land 82 moves past lip 172 to interrupt the fluid communication between the return port 70 and the second bore 56. Further movement brings land 80 adjacent seat 192 to begin to meter the flow of the continuous flowing hydraulic power steering fluid until seal 174 reaches groove 176 to allow fluid to flow into cross bore 88 through the axial bore 86 out the cross bore 90 for distribution to the control conduit 32 through the control port 74. The hydraulic power steering fluid in conduit 32 flows past the hydraulic fuse 126 to the cylindrical housing 161 and moves piston 159 which in turn moves piston 152 with a corresponding braking force to operate the master cylinder 34 for effecting brake actuation of the wheel brakes 36 in the trailer. Since the same hydraulic fluid pressure acts on both land 78 and land 84, a balanced valve condition occurs and thereby the movement of the second piston 76 is only responsive to the movement of lever 94 by the first piston 62. Upon termination of the braking input force on pedal 18, the hydraulic force acting on the first piston 62 terminates, allowing spring 114 to move the second piston toward the lever 94. As the second piston 76 is moved, land 82 again seats on lip 180 to interrupt the communication between the power steering pump 40 and the control port 74. With still further movement land 82 moves away from lip 172 to provide communication between the control port 74 and the return port 70. With the return port opened, the hydraulic fluid communicated to operate piston 152 is returned to the reservoir 72 in the pump 40.

If the operator wishes to only operate the trailer brakes, knob 182 is moved to supply an input force to cable 112 which causes actuation lever 110 to engage projection 184 on lever 94 and move the second piston 76 to divert a portion of the power steering hydraulic fluid into the control conduit 32 and supply piston 152 with an input force sufficient to operate master cylinder 34.

Additionally, if the tow vehicle and trailer should become disengaged, chain 162 of the lanyard means 160 will move notch 188 past leaf spring 190 to lock the piston 152 in a fixed position such that the trailer brakes are supplied with a maximum actuation force.

We claim:

1. In a tow vehicle-trailer braking system having a first servomotor for operating a first braking system in the tow vehicle and a second servomotor for operating a second braking system in the trailer, control means responsive to an actuation signal for operating the second servomotor, said control means comprising:
   a first housing having a first bore and a second bore therein, said housing having a first entrance port connecting the first bore with said first braking system, a second entrance port connecting said second bore with a fluid output of a pump located in said tow vehicle, a first exit port for connecting said second bore with a fluid operating apparatus in the tow vehicle, a second exit port for providing a return connection to said pump for said fluid output in said second bore, and a first control port for connecting said second bore with said second servomotor;
   first piston means located in said first bore having a face responsive to fluid pressure in the first braking system for moving a first end;
   second piston means located in said second bore having a first cylindrical section with a series of lands thereon for regulating the communication of said fluid output of the pump between the second entrance port, the first exit port, the control port, and the second exit port, said cylindrical section having an axial passageway for allowing any fluid output present in said second bore to be of equal pressure across said lands, said second piston means having a second cylindrical section with a second end thereon; and
   lever means pivotally positioned on said first housing for transmitting a first operational force, derived from fluid pressure in the first braking system acting on said first end of the first piston, to the second end of the second piston, said first operational force moving said second cylindrical section such that said lands on said first cylindrical section divert a portion of said fluid output from said pump from said second entrance to the control port for simultaneously actuating the second servomotor with the first servomotor.

2. In the tow vehicle-trailer braking system, as recited in claim 1 wherein said lever means includes:
   adjustment means for shifting the position of a pivot pin to modify the first operational force transmitted from the first piston means to the second piston means.

3. In the tow vehicle-trailer braking system, as recited in claim 2 wherein said control means further includes:
   resilient means located in said second bore for urging said second cylindrical section into contact with the lever means.

4. In the tow vehicle-trailer braking system, as recited in claim 3 wherein said second servomotor includes:
   a second housing having a cylindrical bore therein, said second housing having a second control port which is connected to said first control port; and
   plunger means located in said cylindrical bore, said plunger means effecting brake actuation in the second braking system in response to the fluid output from the pump.

5. In the tow vehicle-trailer braking system, as recited in claim 4, further including:
   check valve means responsive to the fluid output of the pump located between said first control port and said second control port, said check valve means preventing communication between the first control port and the second control port if the rate of flow of the fluid output therebetween exceeds a predetermined rate.

6. In the tow vehicle-trailer braking system, as recited in claim 5, wherein said second servomotor further includes:
   lanyard means attached to said tow vehicle and connected to said second housing for moving said plunger means in said cylindrical bore if said tow vehicle and said trailer should be separated.

7. In the tow vehicle-trailer braking system, as recited in claim 6, wherein said lanyard means includes:
   arm means which extend through said second housing into engagement with said plunger means; and
   resilient means attached to the second housing for preventing said arm means from affecting the operation of said plunger means by said fluid output from said pump.

8. In the tow vehicle-trailer braking system, as recited in claim 7 wherein said lever means includes:
   hand control means responsive to an operator input for moving said second piston means to establish a second operational force by diverting a portion of the fluid output of the pump through said control port for moving the plunger means to operate the second servomotor and thereby actuate the second braking system.

* * * * *